United States Patent [19]
Foltz

[11] Patent Number: 5,261,223
[45] Date of Patent: Nov. 16, 1993

[54] MULTI-HOLE FILM COOLED COMBUSTOR LINER WITH RECTANGULAR FILM RESTARTING HOLES

[75] Inventor: Howard L. Foltz, West Chester, Ohio

[73] Assignee: General Electric Company, Cincinnati, Ohio

[21] Appl. No.: 957,978

[22] Filed: Oct. 7, 1992

[51] Int. Cl.⁵ .............................................. F02C 3/06
[52] U.S. Cl. ..................................... 60/39.36; 60/757
[58] Field of Search ................... 60/39.36, 752, 754, 60/755, 757

[56] References Cited

U.S. PATENT DOCUMENTS

| | | | |
|---|---|---|---|
| 2,576,046 | 11/1951 | Scarth | 60/39 |
| 3,408,812 | 11/1968 | Stenger | 60/757 |
| 3,420,058 | 1/1969 | Howald et al. | 60/39 |
| 3,623,711 | 11/1971 | Thorstenson | 263/19 |
| 3,737,152 | 6/1973 | Wilson | 60/39 |
| 4,050,241 | 9/1977 | DuBell | 60/39 |
| 4,226,088 | 10/1980 | Tsukahara | 60/752 |
| 4,232,527 | 11/1980 | Reider | 60/728 |
| 4,485,630 | 12/1984 | Kenworthy | 60/757 |
| 4,687,436 | 8/1987 | Shigeta | 431/173 |
| 4,696,431 | 9/1987 | Buxe | 239/265 |
| 4,763,481 | 8/1988 | Cannon | 60/737 |
| 4,848,081 | 6/1989 | Kennedy | 60/261 |
| 4,878,283 | 11/1989 | McLean | 29/163 |
| 4,896,510 | 1/1990 | Foltz | 60/757 |

FOREIGN PATENT DOCUMENTS 2022711 12/1979 United Kingdom ................... 60/754
2221979 2/1990 United Kingdom .

OTHER PUBLICATIONS

"Multihole Cooling Film Effectiveness and Heat Transfer" by R. E. Mayle and F. J. Camarata in Transactions of the ASME, Nov., 1975.

"Alternate Cooling Configuration for Gas Turbine Combustion Systems" by D. A. Nealy, S. R. Reider, & H. C. Mongia in Advisory Group for Aerospace Research and Development, May 6-10, 1985.

*Primary Examiner*—Richard A. Bertsch
*Assistant Examiner*—W. J. Wicker
*Attorney, Agent, or Firm*—Jerome C. Squillaro; James P. Davidson

[57] ABSTRACT

A gas turbine engine combustor liner having conventional dilution holes disposed therethrough and multi-hole film cooling holes to provide a cooling film on the hot side of the liner is provided with generally rectangular film starting apertures disposed downstream, with respect to the predetermined cooling film flow direction, of the dilution holes in predetermined otherwise cooling film dry areas on the hot side of the combustor liner. In one embodiment the multi-hole film cooling holes and the rectangular film starting apertures are angled sharply in the downstream direction and angled in a circumferential direction which generally coincides with a predetermined swirl angle of the flow along the surface of the liner within the combustion zone.

10 Claims, 4 Drawing Sheets

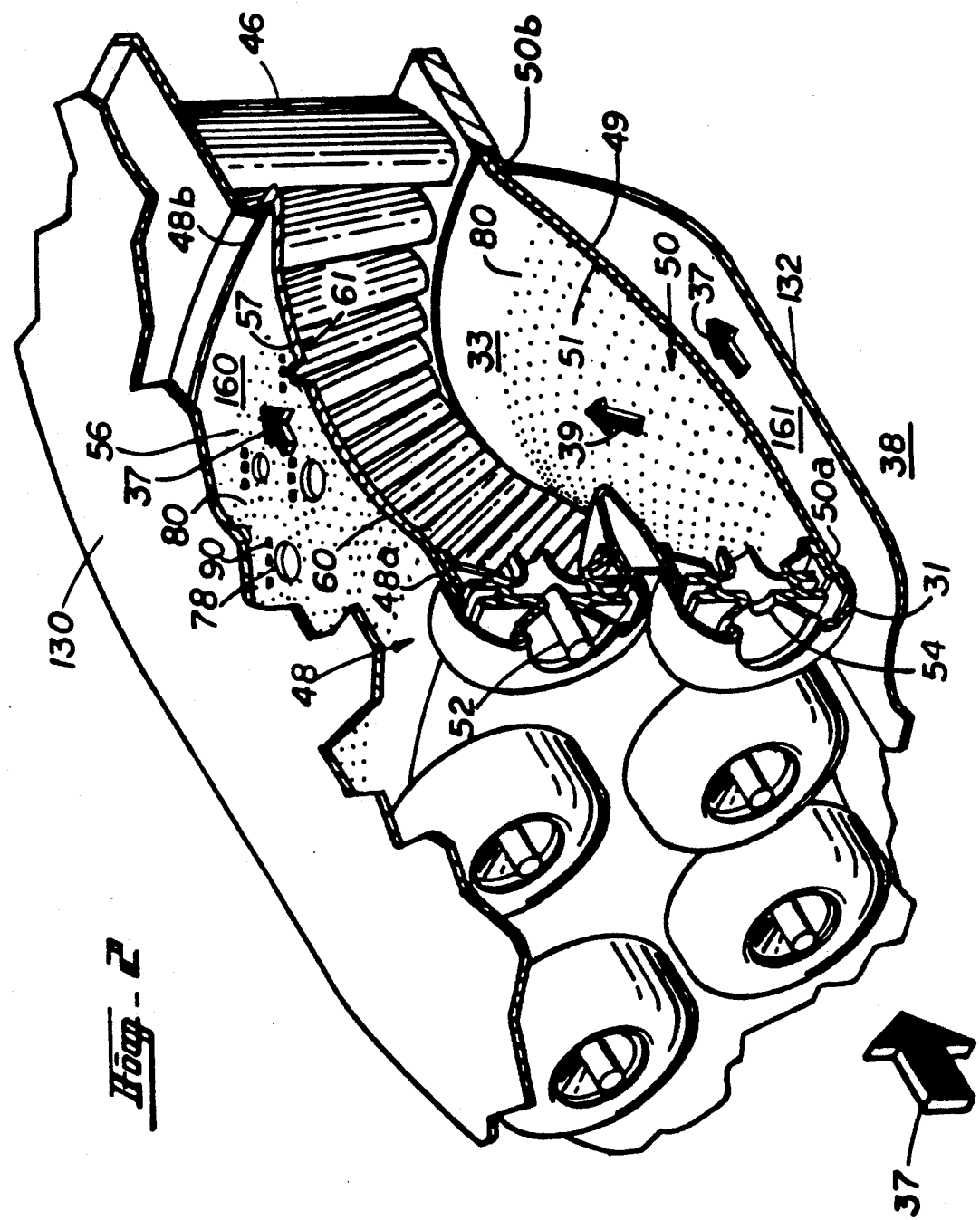

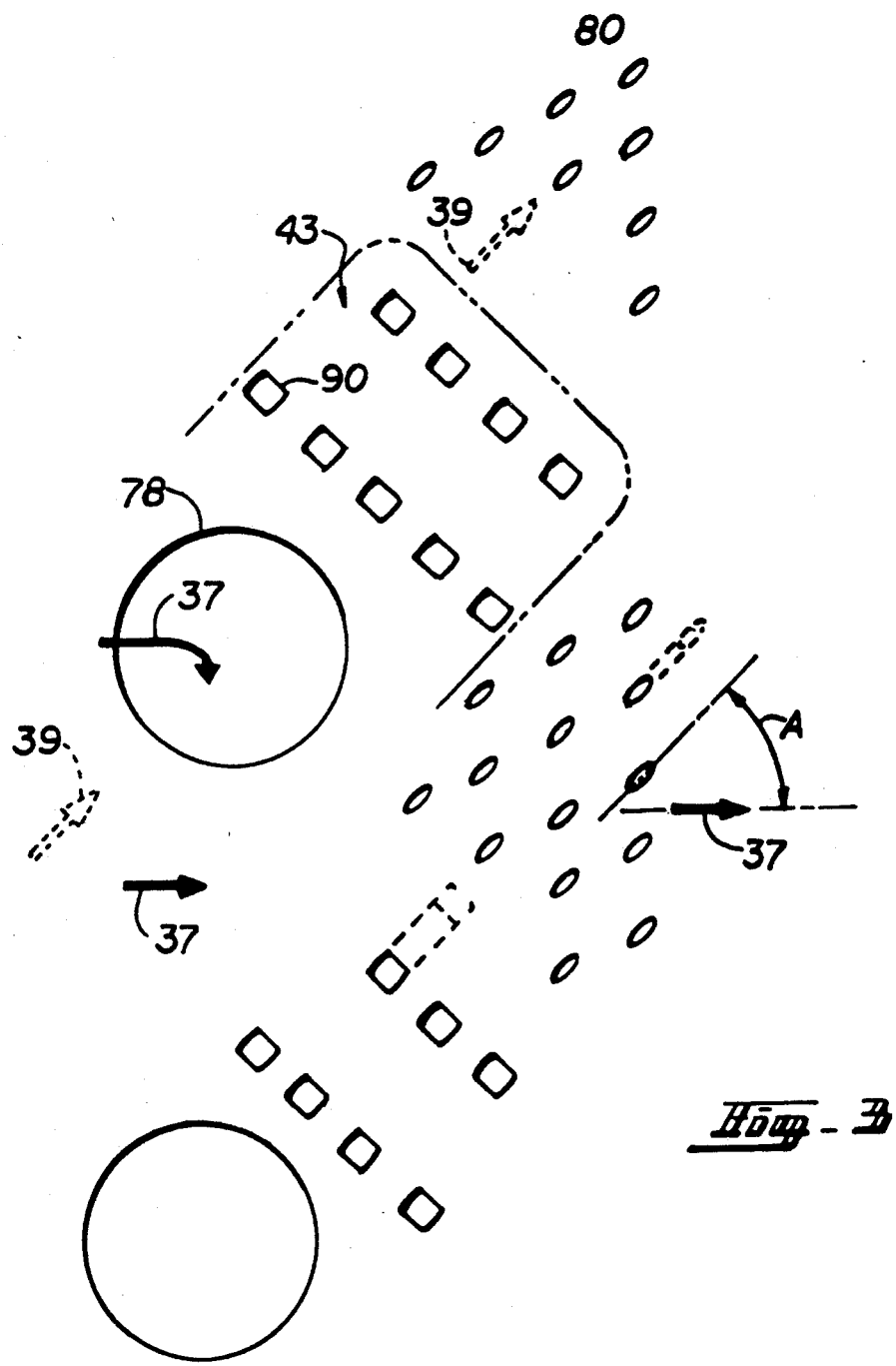

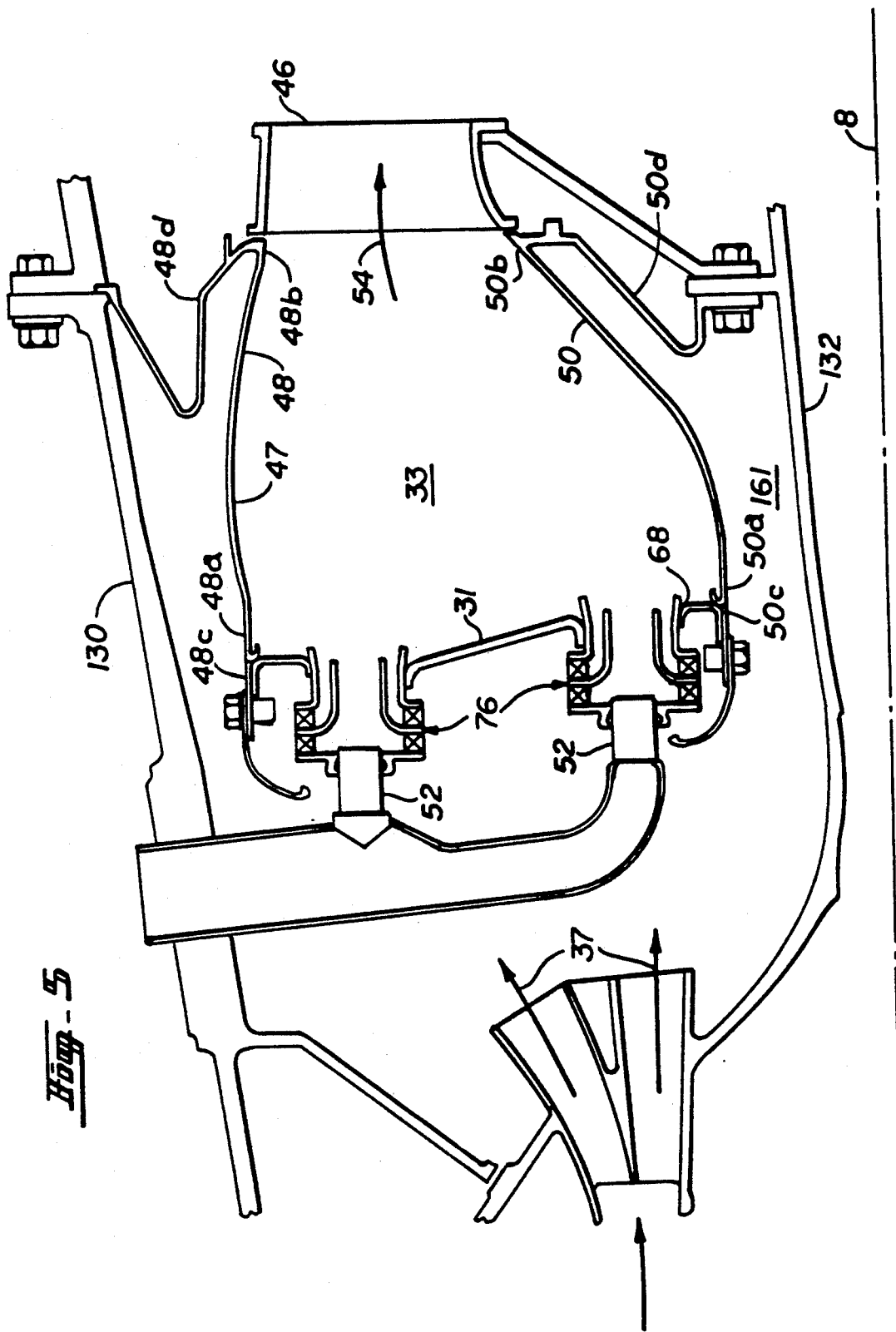

MULTI-HOLE FILM COOLED COMBUSTOR LINER WITH RECTANGULAR FILM RESTARTING HOLES

BACKGROUND OF THE INVENTION

1. Field of the Invention

This invention relates to multi-hole film cooled combustor liners for use in gas turbine engines, and more particularly, combustor liners having rectangular cooling film restarting holes to restart cooling films that are swallowed by large film interrupting apertures.

2. Description of Related Art

Combustor liners are generally used in the combustion section of a gas turbine engine which is located between the compressor and turbine sections of the engine. Combustor liners are also used in the exhaust section of aircraft engines that have afterburners. Combustors generally include an exterior casing and an interior combustor wherein fuel is burned producing a hot gas usually at an intensely high temperature such as 3,000° F. or even higher. To prevent this intense heat from damaging the combustor casing before it exits to a turbine, a heat shield or combustor liner is provided in the interior of the combustor. This combustor liner thus prevents the intense combustion heat from damaging the combustor casing and the rest of the engine.

Many designs have been developed to cool the liners with cooling air taken from the cooling air passageway between the liner and casings. Prior methods for film cooling combustion liners provided circumferentially disposed rows of film cooling slots such as those depicted in U.S. Pat. No. 4,566,280 by Burr and U.S. Pat. No. 4,733,538 by Vdoviak et al. which are typified by complex structures that have non-uniform liner thicknesses which give rise to thermal gradients which cause low cycle fatigue in the liner and therefore shorten their potential life expectancy and reduce their durability. The complex shapes and machining required to produce these liners negatively effects their cost and weight.

A more detailed discussion of the related art may be found in a related U.S. Pat. No. 5,181,379, entitled "GAS TURBINE ENGINE MULTI-HOLE FILM COOLED COMBUSTOR LINER AND METHOD OF MANUFACTURE", invented by Wakeman et al., issued Jan. 26, 1993, assigned to the same assignee, and incorporated herein by reference. Wakeman et al. developed a single wall multi-hole film cooled liner wherein the liner was disposed directly in the cooling air passage between it and the casing thereby forming the inner boundary of the cooling air passage.

Multi-hole film cooling holes are small, spaced closely together, sharply angled downstream with respect to flow along the liner and preferably cylindrical so as to form at least one continuous pattern designed to inject cooling air from the cold side of the liner onto the hot side in order to provide film cooling over the length of the liner. One particular design of a multi-hole film cooled annular liner clocks the multi-hole film cooling holes with a circumferential angle with respect to the combustor centerline of between 30 and 65 degrees. This design is the subject of a U.S. Pat. Application No. 07/614,368, and is entitled "COMBUSTOR LINER WITH CIRCUMFERENTIALLY ANGLED FILM COOLING HOLES" by Phillip D. Napoli, filed Nov. 15, 1990, assigned to the same assignee, and incorporated herein by reference.

Another particular feature of a multi-hole film cooled annular liner provides a liner that is arched and that is particularly useful for outer annular liners for which it provides buckling resistance. This design is the subject of a U.S. Pat. Application No. 07/591,311, and is entitled "ARCHED COMBUSTOR" by Hubert S. Roberts et al., assigned to the same assignee, and also incorporated herein by reference. These references provide background information for the present invention and are incorporated herein by reference.

The flow of air from the cooling air passage through the multi-hole film cooling holes and the dilution holes is possible because combustors are designed to create a positive pressure differential across the liner from the cooling air passage to the combustion zone. Pressure differentials significantly larger than prior art effusion cooled combustor liners are needed for multi-hole film cooling to inject cooling air onto the hot side of the liner through the small multi-hole film cooling holes and with sufficient velocity to form the cooling film. The arched combustor liner, as dislosed in the "ARCHED COMBUSTOR" patent above, provides significant bucking resistance with a minimum effect on the aerodynamics of the combustor and the complexity and cost of the combustor liner which is an expensive replacement part.

Combustor liners conventionally have an additional feature referred to as dilution holes which are much larger than the multi-hole film cooling holes and are designed to pass air into the combustion zone within the combustor liner to dilute the hot gases in the combustion zone and sometimes to further combust the fuel mixture in the combustion zone. Dilution holes, in a multi-hole film cooled liner, swallow the cooling film producing a cooling film dry or unwetted area just downstream, with respect to the film cooling air direction, of the dilution holes. These dry areas extend downstream till the multi-hole film cooling holes have reestablished the cooling film and to such an extent that significant portions of the liner just downstream of the dilution holes are subject to substantial more thermal degradation than the cooling film wetted portions of the liner. This causes hot spots in these dry areas due to the inability of the cooling film to restart for a significant length just downstream of the dilution holes. A sort of cooling film shadow is cast by the dilution holes with respect to cooling film flow on the liner. Circumferential spacing of the dilution holes cause circumferential thermal variations and their attendant thermal differential stresses.

Therefore in order to incorporate the advantages of low weight multi-hole film cooled combustor liners capable of withstanding the temperatures and pressure differentials found in combustors the inventor has developed a means to avoid a discontinuity in the cooling film caused by dilution holes in the cooling film shadow area caused by the dilution holes.

SUMMARY OF THE INVENTION

The present invention provides a multi-hole film cooled combustor liner having dilution holes with generally rectangular film starting apertures disposed downstream, with respect to the predetermined cooling film flow direction, of the dilution holes in predetermined otherwise cooling film dry areas on the combustor liner. The predetermined dry areas are caused by the dilution holes swallowing the multi-hole cooling film. The rectangular film starting apertures are angled downstream and may be further angled circumferentially as described in the Napoli reference wherein the film cooling effectiveness is improved by angling or clocking the multi-hole film cooling holes and the rectangular film starting apertures in the circumferential direction which is best accomplished by drilling the apertures so that the axis of each rectangular film starting aperture is 30 to 65 degrees to the combustor flow path.

The orientation of the clocking of the multi-hole film cooling holes and the rectangular film starting apertures is preferably set to coincide with a predetermined direction corresponding to the combustor swirl pattern as may be generated by the dome swirlers and stage 1 high pressure turbine nozzle inlets.

In accordance with one embodiment of the present invention, the combustor liner may be arched in cross-section which is designed to prevent buckling and is particularly useful for outer burner liners in the combustion section of gas turbine engines.

ADVANTAGES

Rectangular film starting apertures disposed in predetermined dry areas downstream of the dilution holes restart the cooling film in the otherwise cooling film dry areas thereby providing a more evenly cooled liner and serves to eliminate or suppress hot spots in these otherwise cooling film dry areas. The present invention reduces axial and circumferential thermal variations and their attendant thermal differential stresses and thermal degradation of the combustor liner. The present invention reduces thermal degradation of the combustor liner and enhances the use of thin multi-hole film cooled liners that are substantially lighter than conventionally cooled combustor liners.

The present invention also provides a means that allows a reduction in the amount of liner cooling airflow and therefore improved engine performance. The clocking of the multi-hole film cooling holes and the film starting apertures provide enhanced cooling particularly for pattern and profile limited engines and or reduced metal temperatures for endurance limited engines.

Combustor liners made in accordance with the present invention dramatically reduces the radial temperature gradients typically found in conventional nugget or panel film cooled combustor liners. Reduction of these radial gradients result in a consequent reduction in thermal hoop stress and improved Low Cycle Fatigue life. The use of the present invention having arched combustor liners is particularly advantageous when used for the outer liner of the combustion section of the engine to provide a low cost means of imparting buckling resistance to the combustor liner, particularly modern multiple dome short combustors.

BRIEF DESCRIPTION OF THE DRAWINGS

The foregoing aspects and other features of the invention are explained in the following description, taken in connection with the accompanying drawings where:

FIG. 2 is a perspective view of the core engine combustion section of the engine depicted in FIG. 1.

FIG. 3 is an enlarged platform view of a portion of the multi-hole film cooled combustor liner in FIG. 2.

FIG. 5 is a cross-sectional view of the multi-hole film cooled combustor liner in FIG. 2 depicting its arched cross-section.

DETAILED DESCRIPTION OF THE INVENTION

Figure 1:
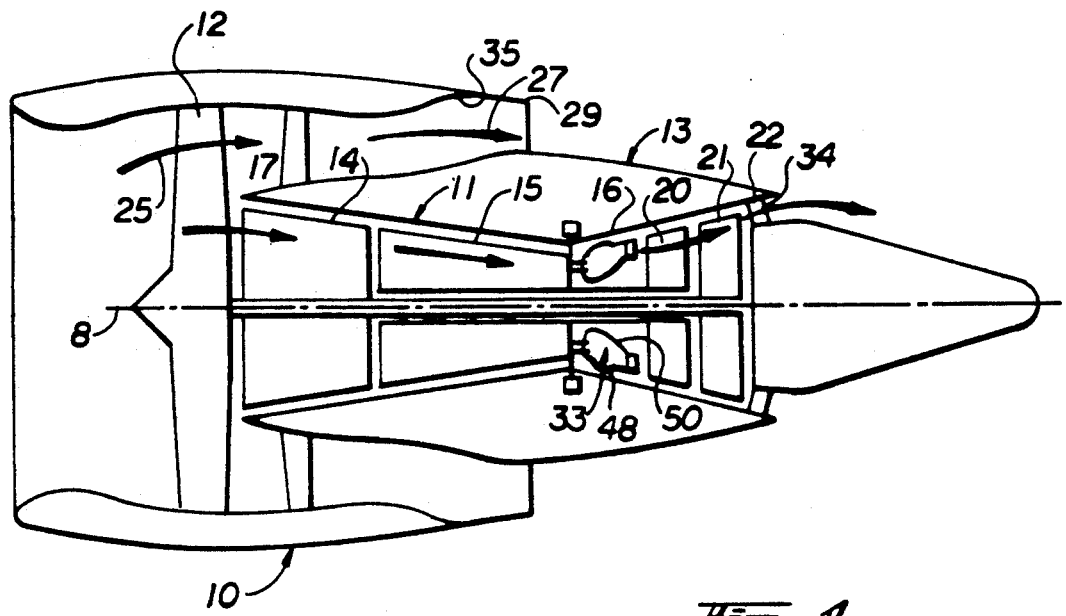
FIG. 1 is a diagrammatic view of a typical gas turbine engine including a core engine combustion section having combustor liners in accordance with the present invention.

The gas turbine engine of FIG. 1 represents a conventional aircraft gas turbine engine having a combustion section combustor and afterburner employing combustor liners of the present invention.

Referring to FIG. 1, a typical gas turbine engine 10 is shown comprising a fan section 12 which is in serial flow relationship with an engine core 13 and with a by-pass duct 35 which is generally disposed, in concentric fashion, about the engine core 13. Flow from engine core 13 and by-pass duct 35 is discharged to an exhaust section 22 having a nozzle 34 used to help produce thrust. A splitter 17 by-passes a portion of the airflow 27, referred to as by-pass flow, from fan section 12 through by-pass duct 35 around engine core 13. The remaining airflow, referred to as core airflow 25, is compressed in the compressor section 11 first by low pressure compressor 14 and then high pressure compressor 15 and the compressed core airflow 25 is then discharged to a combustion section 16 which includes axially and circumferentially extending multi-hole film cooled outer and inner combustor liners 48 and 50, respectively, in accordance with one embodiment of the present invention.

The outer and inner combustor liners 48 and 50 are radially spaced from each other to define a portion of annular combustion flow path or combustion zone 33 therebetween where a portion of core flow 25 is mixed with fuel and the resultant mixture is combusted. The combustion section produces hot combustion gases which are mixed with the remainder of the compressor discharge flow and the resultant heated effluent is then flowed to a high power turbine section 20 which powers high pressure compressor 15 and to a low power turbine section 21 which powers low pressure compressor 14 and fan section 12. Outer and inner combustor liners 48 and 50 contain the hot combustion gases and provide a flow path suitable to promote efficient combustion.

Pressurized air enters combustion section 16 where it is mixed with fuel and burned. The hot gases of combustion may, in some gas turbine engines, exceed 3000° F. After flowing through the turbine section 20 and 21 the hot gases are then expelled at a high velocity from the engine 10 through the core engine exhaust nozzle 34, whereby the energy remaining therein provides thrust. Thrust is also produced by a fan nozzle 29 using the energy produced by fan section 12 that is in bypass flow 27.

Referring now to FIG. 2, a perspective view of the combustion section 16 is depicted comprising a combustor assembly 38 positioned in the compressor discharge flow 37 between an outer combustor casing 130 and an inner combustor casing 132 in energized fluid supply communication with the turbine section denoted by turbine nozzle vanes 46. Combustor assembly 38 is further comprised of axially and circumferentially extending outer and inner multi-hole film cooled combustor liners 48 and 50, respectively, radially spaced from each other to define a portion of annular flow path or combustion zone 33 therebetween. Liners 48 and 50 include at least one generally continuous pattern 56 of multi-hole film cooling holes 80 for cooling the liners with a cooling film 39, conventional dilution holes 78, and generally rectangular cross-sectional film restarting apertures 90. The generally continuous pattern 56 of multi-hole film cooling holes 80 generally extends from an outer liner forward end 48a to an outer liner aft end 48b for the entire extent of the outer liner 48 extending both axially therebetween and circumferentially relative to the engine centerline 8 shown in FIG. 1.

Outer liner 48 and outer casing 130 form an outer cooling airflow passage 160 therebetween and inner liner 50 and inner casing 132 form an inner cooling airflow passage 61 wherein said passages provide for receiving cool compressor discharge air 37 which is used to cool inner liner 50 and outer liner 48. Disposed at the upstream end of combustor liners 48 and 50 is a plurality of fuel injectors 52 mounted within a plurality of nozzle apertures 54 in the combustor dome 31 of combustor assembly 38. Note, that combustor assembly 38 and outer and inner combustor liners 48 and 50 have a preferred annular configuration, extending circumferentially about the centerline 8 of the engine and dome 31 is of the double dome type to accommodate a double annular ring of fuel injectors 52. The invention is particularly useful for short clean burning combustors of the multiple dome type such as double dome 31 but is also useful in single dome type combustors. Accordingly, fuel injectors 52 are circumferentially spaced from each other to provide a number of injection points for admitting a fuel/air mixture to combustor assembly 38 over the circumferential extent of annular combustion flow path 33.

The upstream or forward ends 48a and 50a of combustor liners 48 and 50 respectively include means to axially and radially support combustor dome 31. The downstream or aft ends 48b and 50b of outer and inner combustor liners 48 and 50 respectively are fixedly connected to outer and inner combustor casings 130 and 132 respectively to provide axial and radial support for the liners and dome assembly and allows for thermal growth of the assembly in the radial and axial directions. This axially aft mounting means, which includes having the liners being tied together at their forward ends by the dome 31, provides the axial restraint for the arched outer combustor liners 48 to resist the radially inward directed buckling forces induced by the pressure in the combustion zone 33 being higher than the pressure in the outer cooling airflow passage 160. Outer liner 48 and inner liner 50 are preferably comprised of a single wall annular sheet or shell with the outer liner 48 having a generally axially extending arched cross-section 60. Outer liner 48 and inner liner 50 are otherwise constructed similarly in the preferred embodiment, each having a cold side 57 in contact with the relatively cool air outside combustion zone 33 and a hot side 61 facing the combustion zone. Each includes a means for providing multi-hole film cooling of liner 48 using multi-hole film, preferably cylindrical, cooling holes 80 and rectangular film restarting apertures 90 generally downstream of dilution holes 78.

FIG. 3 is a platform radially inward looking view illustrating a small portion of a typical multi-hole film cooled combustor liner, such as outer liner 48 in FIG. 2, as described above having multi-hole film cooling holes 80 and film restarting apertures 90 generally downstream, with respect to a predetermined direction of the cooling film 39, of dilution holes 78. The film restarting apertures 90 are disposed in an otherwise cooling film dry area 43 delineated in FIG. 3 by the dotted line surrounding the film restarting apertures. The film dry area 43 receives little or no cooling film 39 from upstream of the dilution hole 78 because the dilution hole interrupts the cooling film 39 so as to shadow the dry area A from the cooling film 39. This would otherwise prevent dry area 43 from being covered and cooled by the film 39 until it is restarted by the multihole film cooling holes 80. The film restarting apertures 90 are large compared to the multi-film cooling holes 80 and quickly restart the cooling film 39.

Figure 4:
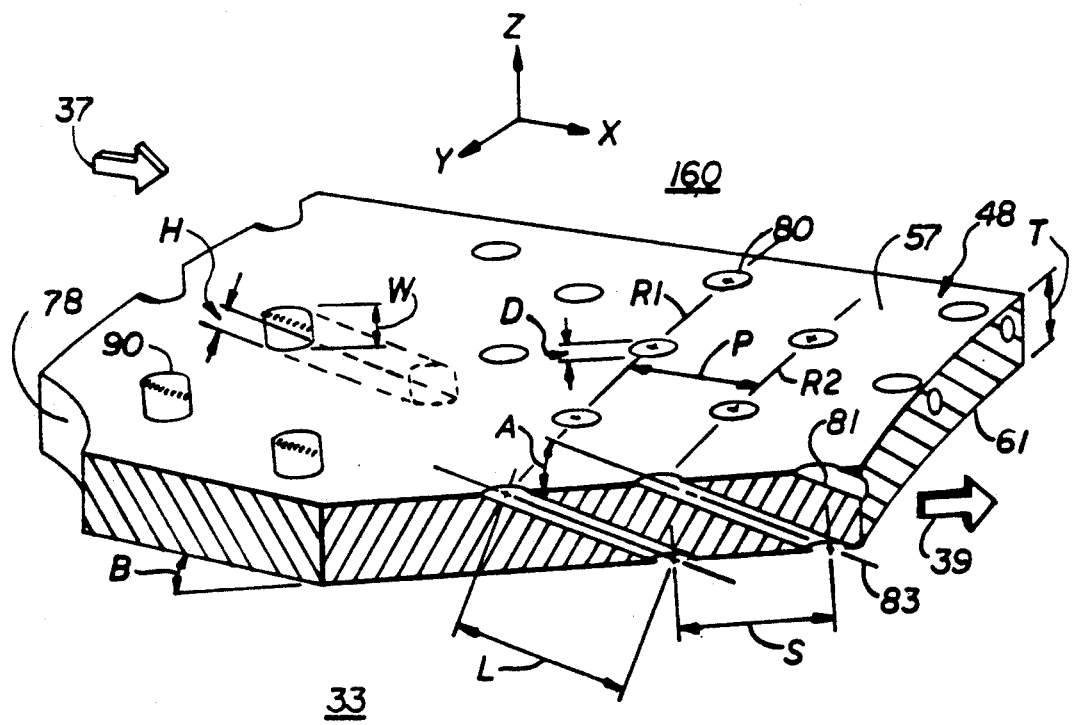
FIG. 4 is an enlarged perspective view of a portion of a multi-hole film cooled combustor liner having cooling film restarting apertures in accordance with the preferred embodiment of the present invention.

Illustrated in FIG. 4 is an enlarged perspective view of a portion of the liner 48 in FIG. 3 including a frame of reference is provided having axis labelled X, Y, and Z. The downstream direction of the compressor discharge flow 37 is in the X direction along the surface of the liner 48, Y is in the circumferential direction, and Z is normal to the combustor liner surface on the surface of the liner 48. The multi-hole film cooling means includes a plurality of very narrow and closely spaced film cooling holes 80 which are sharply angled downstream. Multi-hole film cooling holes 80 have an acute slant angle A that is slanted rearward or downstream from cold surface 57 to hot surface 61 of the liner 48 at an angle in the range of about 15° to 20° and clocked or slanted in the circumferential direction, indicated by Y in the frame of reference, at a clock angle B corresponding to the swirl of the flow which is usually between 30 and 65 degrees with respect to the downstream direction of the flow indicated by the arrow.

From a manufacturing and cost standpoint a downstream slant angle A of about 20° is preferred with respect to either surface of liner 48. Smaller downstream slant angles A may be may be advantageous for improved cooling and therefore an alternative downstream slant angle A in the range of about 20° to 15° may be used if the associated costs are warranted. Downstream slant angles smaller than 15 degrees may weaken the liner structure. The holes have a preferred diameter of 20 mils (0.02 inches) and are preferably spaced in a range of about 130–150 mils (0.13–0.15 inches) off center from each other, as measured be their respective centerlines 83, or about six and one half (6½) hole diameters.

The exemplary embodiment illustrated herein provides circumferentially adjacent cooling holes 80 having an interhole spacing S about 6½ to 7½ hole diameters D and an inter-row spacing P between axially adjacent rows R1 and R2 of cooling holes 80 in the same range. In order to provide a more even circumferential distribution of cooling air, axially adjacent rows R1 and R2 of holes 80 are circumferentially offset by about half the angle or distance between circumferentially adjacent holes or by half the axial distance between row R2 and the previous row R1 of cooling holes. This is done to further enhance the evenness and effectiveness of the cooling film.

The film starting apertures 90 are also sharply slanted downstream and preferably have the same downstream slant angle A as the multi-hole film cooling holes 80 and the same clock angle B, if it is incorporated, corresponding to the swirl of the flow which is usually between 30 and 65 degrees with respect to a predetermined downstream direction of the compressor discharge flow 37 between the outer combustor casing 130 and the inner combustor casing 132. Axially adjacent rows of the film starting apertures 90 are also circumferentially offset by about half the angle or distance between circumferentially adjacent film starting apertures 90 holes or alternatively by half the axial distance between the rows.

The rectangular film restarting apertures 90 in the example illustrated in FIG. 4 have a width W of about 65 mils and a height H of about 20 mils and is slanted preferably at the same downstream slant angle A as the cylindrical multi-hole film cooling holes 80. The rectangular film restarting apertures 90 are also preferably laser drilled.

Dilution air is primarily introduced by a plurality of circumferentially extending spaced apart dilution apertures 78 disposed in each of inner and outer liners 48 and 50. Each aperture 78 and has a cross-sectional area substantially greater than the cross-sectional area of one of the multi-hole cooling holes 80 and are much smaller in number. Dilution apertures 78 and to a smaller extent cooling holes 80 serve to admit additional air into combustor assembly 38. This additional air mixes with the air/fuel mixture from injectors 52 and, to some extent, will promote some additional combustion.

Referring to FIG. 4, liner thickness T, multi-hole film cooling hole spacing S (the distance between cooling hole centerlines 83), film cooling hole length L and diameter D, and cooling hole angle A of cooling holes 80 are a function of the cooling flow requirements to meet the durability characteristics of the particular engine in which it is used. Preferably, the combustor liners have a thermal barrier coating on their hot side 61 to further reduce the heat load into the liners. Cooling holes 80 are laser drilled holes. Typically combustor liner wall thickness T is sized to meet both mechanical loading requirements and to allow the cooling flow through cooling hole 80 to develop an adequate length to diameter ratio (L/D). The L/D is determined by analysis and testing so as to form a good film and to maximize convective cooling along an internal cooling hole surface 81 within cooling hole 80. The cooling holes should be spaced about 7 diameters apart from each other or between centerlines 83 of adjacent cooling holes 80.

Similarly inner liner 50 is formed of a single wall annular sheet or shell having a plurality of very narrow closely spaced sharply slanted film cooling holes 80 which are axially rearward slanted from cold surface 49 to hot surface 51 of liner 50.

The preferred embodiment of the present invention provides a buckling resistance means such as the arched cross-sectional shape of the outer liner 48 as shown in FIGS. 2 and 5. Buckling of outer 48 liner due to inward pressure load is a primary design consideration. Large diameter short length combustors are very useful in reducing pollution and may particularly benefit from the present invention's features including the arched cross-section. The buckling margin is significantly increased by using significant axial curvature in the arched liner to increase its section modules.

Referring more particularly to FIG. 5., conventional stiffening rings are not employed for the outer liner 48 and therefore neither stiffening rings nor cooling nuggets are available for providing buckling resistance capability of the outer liner 48. Instead, the outer liner 48 is configured to have a substantially uniform thickness T (as shown in FIG. 4) from the forward end 48a to the aft end 48b for the entire extent of the outer liner 48 extending both axially therebetween and circumferentially relative to the engine centerline 8. Furthermore, the outer liner 48 is also arcuate, shown at 47, along at least a portion of the outer liner 48. Preferably, the outer liner 48 is convex outwardly relative to the engine centerline 8 in an axial, or longitudinal plane, as illustrated in FIG. 5, from the forward end 48a to the aft end 48b for providing a predetermined buckling resistance capability of the outer liner 48. By configuring the outer liner 48 with a convex arch 47 having substantially uniform thickness, buckling resistance capability is provided solely thereby without the need for conventional stiffening rings, flanges, or cooling nuggets for providing required buckling resistance capability during operation.

More specifically, in the preferred embodiment illustrated in FIG. 5, the outer liner forward end 48a is fixedly connected by an outer axial flange 48c to the dome 31 which is in turn fixedly connected to the inner liner forward end 50a by an inner axial flange 50c for defining a pressure vessel bounding the combustion zone 33. The dome 31 is an annular plate which extends in the radial direction, and therefore is substantially rigid. The outer liner aft end 48b is fixedly connected to the outer casing 130 by the substantially rigid radial flange 48d, and, similarly, the inner liner aft end 50b is rigidly supported y the inner liner radial flange 50d. Accordingly the combustor assembly including the outer liner 48, the inner liner 50, and the combustor dome 31 is axially and radially supported at its aft ends 48b and 50b and is free to grow axially due to thermal heating. Fuel injectors 52 are slideably received in swirlers 76 mounted on dome 31 so as not restrain or be interfered with by the thermal growth of the combustor liners.

While the preferred embodiment of our invention has been described fully in order to explain its principles, it is understood that various modifications or alterations may be made to the preferred embodiment without departing from the scope of the invention as set forth in the appended claims.

I claim:

1. An annular gas turbine combustor liner comprising:
    a hot side and cold side and a forward and aft end and said aft end being located downstream of said forward end,
    a plurality of multi-hole film cooling holes to inject cooling air to form a cooling film on the hot side of the combustor liner,
    a plurality of dilution holes disposed in the liner,
    a plurality of generally rectangular film starting apertures disposed in areas immediately downstream of said dilution holes, with respect to a predetermined cooling film flow direction, and
    wherein said multi-hole film cooling holes and said film starting apertures have respective sharply angled downstream slant angles.

2. A gas turbine combustor liner as claimed in claim 1 wherein said areas are predetermined to be cooling film dry areas on the hot side of the combustor liner wherein it has been predetermined that dilution holes would swallow said cooling film.

3. A gas turbine combustor liner as claimed in claim 2 further comprising a centerline axis about which said annular liner is coaxially disposed and wherein at least a portion of said liner is arched radially outward from said centerline in a longitudinal plane through said centerline for providing buckling resistance of said liner.

4. A gas turbine combustor liner as claimed in claim 1 wherein said multi-hole film cooling holes and said film starting apertures are angled in a circumferential direction.

5. A gas turbine combustor liner as claimed in claim 4 wherein said circumferential direction has a circumferential biased angle is in a range of between 30 and 65 degrees measured generally from an axially extending centerline about which said annular liner is disposed.

6. A gas turbine combustor liner as claimed in claim 4 wherein said multi-hole film cooling holes and said film starting apertures have a downstream slant angle of about twenty degrees.

7. A gas turbine combustor liner as claimed in claim 4 wherein said multi-hole film cooling holes and said film starting apertures have a downstream slant angle in a range of about between ten and twenty degrees.

8. A gas turbine combustor liner as claimed in claim 4 wherein said circumferential direction coincides with a predetermined swirl angle of a flow in a combustor for use with said combustor liner.

9. A gas turbine combustor liner as claimed in claim 8 further comprising a centerline axis about which said annular liner is coaxially disposed and wherein at least a portion of said liner is arched radially outward from said centerline in a longitudinal plane through said centerline for providing buckling resistance of said liner.

10. A gas turbine combustion section comprising:
a combustor casing,
a single wall sheet metal combustor liner disposed inward of said combustor casing,
said combustor liner comprising:
a hot side and cold side and a forward and aft end and said aft end being located downstream of said forward end,
a plurality of multi-hole film cooling holes having sharply downstream angled slant angles to inject cooling air to form a cooling film on the hot side of the combustor liner,
said plurality of multi-hole film cooling holes forming at least one continuous pattern of small, closely spaced, and sharply downstream angled film cooling holes spaced at least sufficiently close enough together to effect a continuous cooling film on said hot side of said combustor liner during combustion section operation,
said continuous pattern extending essentially over the entire length of said combustor liner,
said multi-hole film cooling holes operable to inject all of the cooling air at essentially said slant angle,
a plurality of dilution holes disposed in the liner, and
a plurality of generally rectangular film starting apertures disposed in areas immediately downstream of said dilution holes wherein said rectangular film starting apertures are sharply angled downstream, with respect to a predetermined cooling film flow direction.

* * * * *